(12) United States Patent
Lelkes et al.

(10) Patent No.: US 10,103,669 B2
(45) Date of Patent: Oct. 16, 2018

(54) CONTROL METHOD FOR AN ELECTRICALLY EXCITED MOTOR AND INVERTER

(71) Applicants: Andras Lelkes, Nuremberg (DE); Adam Daniel Lelkes, New York, NY (US)

(72) Inventors: Andras Lelkes, Nuremberg (DE); Adam Daniel Lelkes, New York, NY (US)

(*) Notice: Subject to any disclaimer, the term of this patent is extended or adjusted under 35 U.S.C. 154(b) by 0 days.

(21) Appl. No.: 15/413,433

(22) Filed: Jan. 24, 2017

(65) Prior Publication Data

US 2017/0214351 A1  Jul. 27, 2017

(30) Foreign Application Priority Data

Jan. 26, 2016 (DE) .................. 10 2016 000 743

(51) Int. Cl.
| | | |
|---|---|---|
| *H02P 23/00* | (2016.01) | |
| *H02P 25/00* | (2006.01) | |
| *H02P 27/00* | (2006.01) | |
| *H02P 23/14* | (2006.01) | |
| *G05B 13/02* | (2006.01) | |
| *H02P 25/02* | (2016.01) | |
| *H02P 21/00* | (2016.01) | |
| *H02P 21/14* | (2016.01) | |

(52) U.S. Cl.
CPC .......... *H02P 23/14* (2013.01); *G05B 13/0265* (2013.01); *H02P 21/0025* (2013.01); *H02P 21/141* (2013.01); *H02P 25/02* (2013.01)

(58) Field of Classification Search
CPC .......................... H02P 23/14; G05B 13/0265
USPC ......................................................... 318/798
See application file for complete search history.

(56) References Cited

U.S. PATENT DOCUMENTS

| | | | |
|---|---|---|---|
| 5,365,158 A | 11/1994 | Tanaka et al. | |
| 8,080,964 B2 | 12/2011 | Hudson et al. | |
| 8,179,068 B2* | 5/2012 | Yuuki ............... | H02K 1/2766 318/432 |
| 8,552,678 B2* | 10/2013 | Yuuki ............... | H02K 1/2766 318/718 |

(Continued)

FOREIGN PATENT DOCUMENTS

| | | |
|---|---|---|
| CN | 203026944 U | 6/2013 |
| CN | 103457532 A | 12/2013 |

(Continued)

OTHER PUBLICATIONS

G. Dyanamina et al.: "Rotor flux-based MRAS for three level inverter fed induction motor drive using fuzzy logic controller", Int. J. of Power Electronics, vol. 4, No. 5, Abstract, pp. 463-478 (2012).

(Continued)

*Primary Examiner* — Erick Glass
(74) *Attorney, Agent, or Firm* — Norman B. Thot

(57) ABSTRACT

A method to control a motor which is electrically excited. The method includes providing a unit capable of learning which is configured to analyze processes in a machinery into which the motor is built so as to learn to optimally control a variable motor flux. The unit capable of learning thereby sets the variable motor flux so as to minimize motor losses absent an adverse impact on a dynamic property of a drive

17 Claims, 3 Drawing Sheets

(56) References Cited

U.S. PATENT DOCUMENTS

| | | | |
|---|---|---|---|
| 8,618,761 B2 | 12/2013 | Hudson et al. | |
| 8,860,356 B2 * | 10/2014 | Yuuki | B60L 15/025 318/432 |
| 2006/0006835 A1 | 1/2006 | Vertanen | |
| 2006/0232237 A1 | 10/2006 | Jadot et al. | |
| 2010/0259204 A1 * | 10/2010 | Imura | B60L 11/1803 318/400.02 |
| 2010/0262307 A1 * | 10/2010 | Imura | H02P 21/14 700/287 |
| 2011/0050137 A1 * | 3/2011 | Imura | H02P 21/0003 318/400.15 |
| 2012/0068641 A1 * | 3/2012 | Imura | H02P 21/0017 318/400.02 |
| 2013/0088799 A1 | 4/2013 | Zeller | |
| 2013/0271061 A1 | 10/2013 | Stichweh et al. | |
| 2014/0015468 A1 | 1/2014 | Jang et al. | |
| 2015/0002071 A1 | 1/2015 | Wang et al. | |
| 2015/0155812 A1 | 6/2015 | Jang et al. | |

FOREIGN PATENT DOCUMENTS

| | | |
|---|---|---|
| CN | 104167968 A | 11/2014 |
| CN | 103248306 B | 5/2015 |
| DE | 42 40 210 A1 | 6/1993 |
| DE | 195 05 506 A1 | 8/1996 |
| DE | 196 14 900 A1 | 10/1997 |
| DE | 196 48 534 A1 | 5/1998 |
| DE | 100 53 007 A1 | 5/2001 |
| DE | 103 15 754 A1 | 10/2004 |
| DE | 60 2004 003 804 T2 | 4/2007 |
| DE | 10 2007 003 874 A1 | 2/2008 |
| DE | 10 2009 025 390 A1 | 1/2010 |
| DE | 10 2010 047 017 A1 | 4/2012 |
| DE | 10 2011 118 480 A1 | 5/2013 |
| DE | 10 2013 212 103 A1 | 1/2014 |
| DE | 10 2014 116 977 A1 | 6/2015 |
| DE | 10 2014 213 985 A1 | 1/2016 |
| EP | 0 976 675 B1 | 10/2003 |
| EP | 1 298 511 B1 | 3/2005 |
| JP | 2005-51954 A | 2/2005 |
| KR | 1020070073687 A | 7/2007 |
| WO | WO 2012/037983 A1 | 3/2012 |
| WO | WO 2014/209742 A2 | 12/2014 |

OTHER PUBLICATIONS

T. M. Wolbank et al.: "Möglichkeiten zum Einsatz von neuronalen Netzen zur mechanisch sensorlosen Regelung von umrichtergespeisten Asynchronmotoren", e&i Elektrotechnik and Informationstechnik, vol. 117, No. 2, English Abstract, pp. 113-118 (2000).

N. M. Nordin et al.: "Fuzzy-PI Torque and Flux Controllers for DTC with Multilevel Inverter of Induction Machines", International Journal of Power Electronics and Drive System (IJPEDS), vol. 5, No. 2, pp. 268-282 (2014).

S.-H. Haerian: "Contribution to the cascaded fuzzy control of a field-oriented-driven induction motor", Dissertation, TU Berlin, English Abstract, pp. 1-116 (2002).

* cited by examiner

CONTROL METHOD FOR AN ELECTRICALLY EXCITED MOTOR AND INVERTER

CROSS-REFERENCE TO PRIOR APPLICATIONS

Priority is claimed to German Patent Application No. DE 10 2016 000 743.5, filed Jan. 26, 2016. The entire disclosure of said application is incorporated by reference herein.

FIELD

The present invention relates to a method for energy-saving control of an electromagnetic motor and an inverter which uses the control method.

BACKGROUND

In industry, electric drives use a large amount of electricity. Increasing the energy efficiency of these drives is therefore important both for environmental as well as for economic reasons. In addition to permanent magnet motors, there exist electric motors whose magnetic field is electrically excited. Such motors include separately excited DC motors, induction motors, separately excited synchronous motors, and synchronous reluctance motors. Excitation current causes energy losses for these types of motors. These losses can be classified as one of the following two types for common electric motor types: so-called core losses, and copper losses. The copper losses are caused by the current or the part of the current which is responsible for the excitation of the magnetic field. This part of the losses depends on the strength of the current and the winding resistance. Such winding losses also arise in windings from other materials, for example, aluminum. Since the winding resistance depends on the temperature, this part of the energy loss also depends on the temperature of the material. The other part of the loss arises in the magnetically soft material (for example, lamination steel) of the motor, when the induction changes.

An aspect of the present invention is to reduce the losses which arise from the electric excitement of the motor. To achieve this, field excitation is controlled so that the energy consumption of the machinery in which the drive is built in is reduced without any adverse impact on the dynamic properties of the drive with respect to the specific application.

Most highly dynamic electric drives work with so-called field oriented control (FOC). This control was originally developed for the dynamic control of three-phase induction motors, but can also be used for other kinds of electric motors. The basic idea of the field oriented control of a three-phase induction motor is that the stator current $i_1$ can be separated into two components, $i_{1d}$ and $i_{1q}$. Represented as space vectors, these two components are orthogonal to each other. The current component $i_{1d}$ is parallel with the space vector of rotor flux ($\Psi_2$); $i_{1q}$ is perpendicular thereto. The magnitude of the rotor flux $\Psi_2$ is determined by $i_{1d}$. Torque m depends on the product of rotor flux $\Psi_2$ and the current component $i_{1q}$. Torque m obeys this product without any delay; in contrast, the rotor flux $\Psi_2$ reacts to changes in the current component $i_{1d}$ with a large time lag. This time lag depends on the electric time constant of the rotor.

The maximum motor torque $m_{max}$ is limited by the rotor flux $\Psi_2$ and by the maximum of the current component $i_{1q}$. The maximum motor current (stator current) that can be delivered by the inverter is limited by the inverter itself. The rotor flux $\Psi_2$ on the other hand is limited by the core losses in the motor. At high excitation, the soft magnetic material of the motor goes into saturation and the hysteresis losses increase disproportionately. The flux is therefore most commonly not chosen over the nominal flux.

The time constant of the stator winding limits the maximal rate of change of the stator current. This implies that the inductance of the motor inhibits a jumpy increase of the current. The time constant of the stator winding is, however, at least an order of magnitude smaller than the time constant of the rotor. The time lag caused by the time constant of the stator winding can also be compensated by suitable current control in the inverter. A rapid increase of the motor torque is therefore limited by the incapability of rotor flux to be increased rapidly. The rotor flux of highly dynamic drives is therefore kept constantly large in order to make rapid changes in motor torque possible with minimum time lag.

Because of this, field oriented control systems work with a constantly high current component $i_{1d}$ in order to produce big rotor flux, even when a smaller flux would be equally sufficient for the actual operating point with a low torque requirement. Disadvantages of this method are the increased losses in the motor (core and winding losses), in the power switches of the inverter (switching losses and on state power dissipation), as well as losses in the passive components, such as in the power choke, the dc link capacitors, the wire connections etc.

A different control method is used to achieve higher speed. In this case, the motor flux is reduced in order to make higher speed than nominal possible in spite of limited stator voltage. This method is called field weakening. The reduced capability of the motor for creating torque must thereby be accepted.

High power drives which do not need high dynamics, for example, drives for railway vehicles, are often controlled differently. The current component $i_{1d}$ in such drives is not attempted to be keep constant, a constant ratio between $i_{1d}$ and $i_{1q}$ is much rather intended. This method is in particular often utilized in current source inverters (CSI). This control method is, however, not suitable for highly dynamic applications.

SUMMARY

An aspect of the present invention is to provide a favorable trade-off between minimum losses and maximum dynamics. Many machines do not operate with a constant maximum torque. An operation of an electric motor with variable flux is therefore proposed, the flux depending on directly measurable and/or indirectly computable variables, such as time, operating mode, rotor position etc. It is thereby important that the motor flux be as small as possible in order to minimize the losses. The flux must, however, always be large enough to generate the torque necessary for the actual operation.

In an embodiment, the present invention provides a method to control a motor which is electrically excited. The method includes providing a unit capable of learning which is configured to analyze processes in a machinery into which the motor is built so as to learn to optimally control a variable motor flux. The unit capable of learning thereby sets the variable motor flux so as to minimize motor losses absent an adverse impact on a dynamic property of a drive.

BRIEF DESCRIPTION OF THE DRAWINGS

The present invention is described in greater detail below on the basis of embodiments and of the drawings in which.

Figure 1:
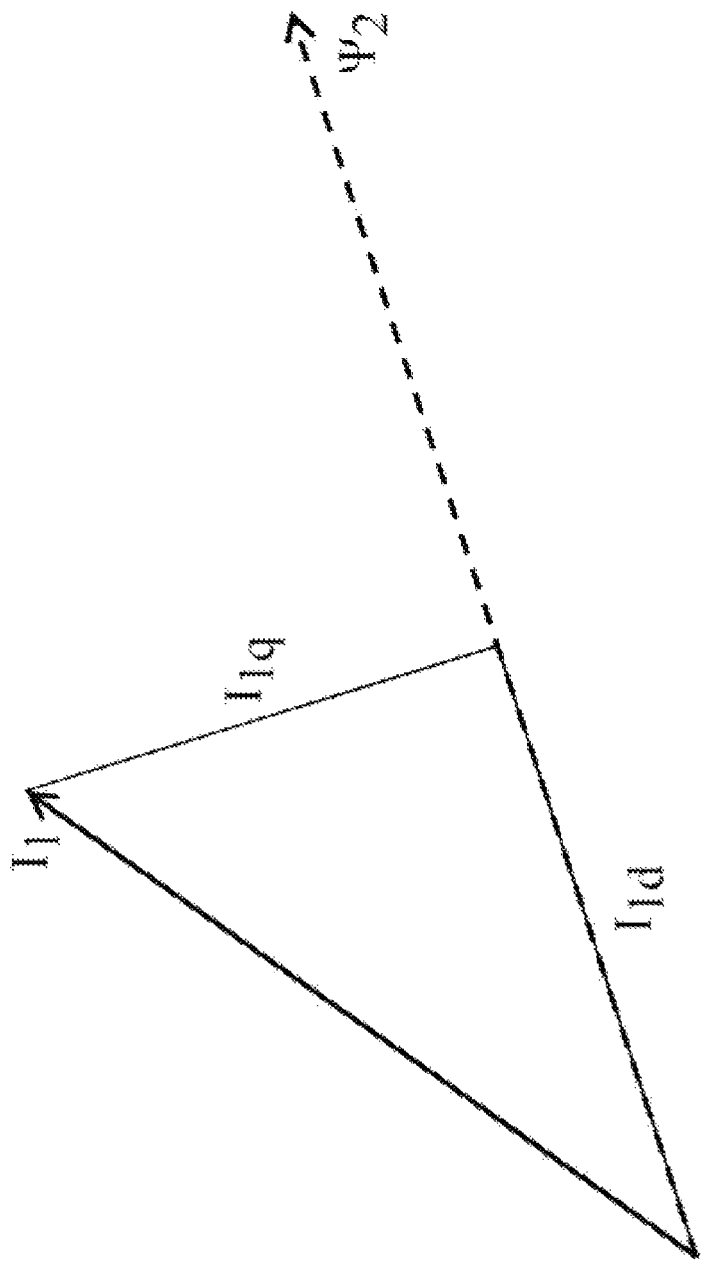
FIG. 1 shows the rotor flux ($\Psi_2$), the current components for the flux excitation ($i_{1d}$) and for the torque generation ($i_{1q}$) of an induction motor in a space vector diagram.
Figure 2:
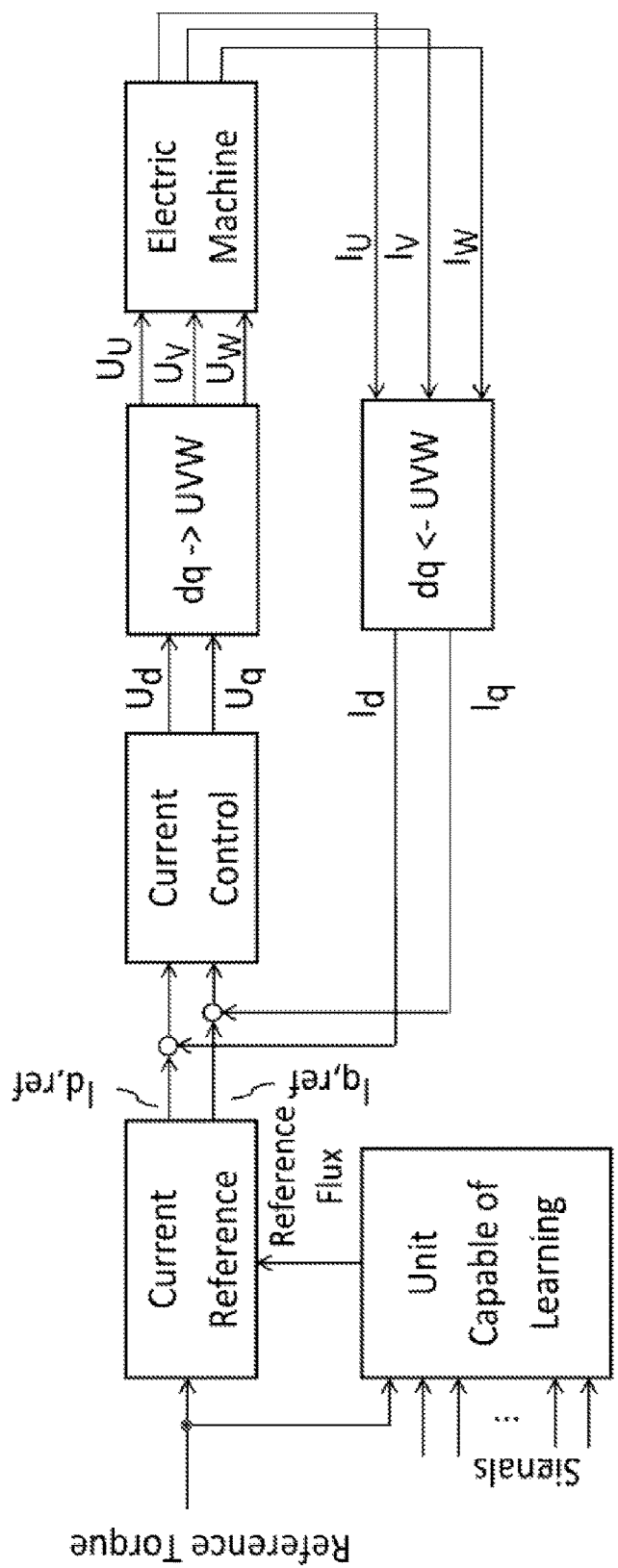
FIG. 2 shows the control structure for the motor control in an embodiment.
Figure 3:
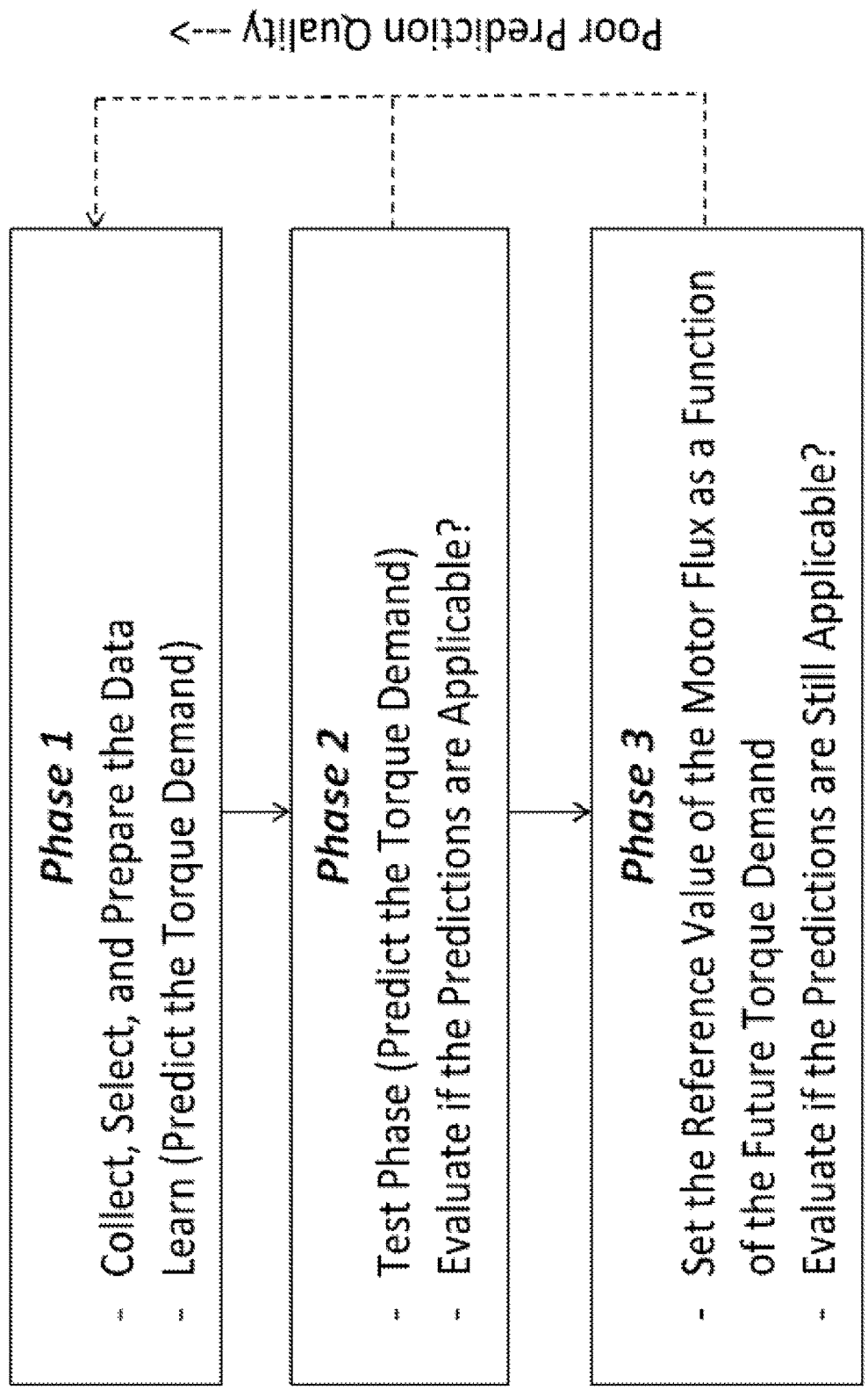
FIG. 3 shows the operational flow diagram for the unit capable of learning in an embodiment.

In a first operational phase (Phase 1) of FIG. 3, the unit capable of learning collects data available in the field, selects data which are relevant to the learning process, prepares the selected data, and implements the learning method. In the second operational phase (Phase 2), the unit capable of learning compares its predictions for the torque demand to the actual torque demand and decides whether the predictions are accurate enough for the application. If this is not the case, the unit capable of learning restarts phase 1, possibly with a different learning algorithm. If the results are satisfactory, the third operational phase (Phase 3) can be started. In this phase, the predictions of the unit capable of learning for the future torque demand are utilized for energy-saving adjustments of the motor flux. In this operational phase, the unit capable of learning also continuously evaluates the quality of its predictions. In case a decline in prediction quality is experienced, the process will be restarted with phase 1.

DETAILED DESCRIPTION

The maximum demand of torque as a function of operating data can be stored in tabular form. Another possibility is representing the value of the future torque demand by a decision tree. Regardless of the manner of the realization, a fixed setting of the target is problematic because of the incapability of reacting to changes in the system or in the conditions of operation. The control system is extended with a unit capable of learning according to the present invention. The purpose of the unit capable of learning is the optimal setting of the reference input value of the motor flux ($\Psi_{2ref}$) or, alternatively, of the reference input value of the current component $i_{1d}$ ($i_{1d\ ref}$), according to the control structure of the inverter. In case of a closed-loop flux control integrated in the inverter, the reference input is the demanded motor flux. In case of an open-loop flux setting, the reference input is the current component responsible for the flux excitation. The task of the unit capable of learning is the prediction of the maximum demanded motor torque or the prediction of the minimum necessary rotor flux. The unit capable of learning must learn the characteristics of the machinery and the regularity in its control. If there are such regularities, the unit capable of learning can recognize them and utilize them to reduce the energy consumption of the drives.

It is generally known that machine learning is able to recognize patterns in signals. The unit capable of learning can be based on known machine learning methods, such as "Decision Tree Learning", "k-Nearest Neighbor", "Linear Regression", "Logistic Regression", "Winnow", "LASSO", "Ridge-Regression", "ARIMA", "Perceptron", "Artificial Neural Networks", "Deep Learning", "Naive Bayes", "Bayesian Network", "Support Vector Machines", "Boosting", "Reinforcement Learning", "Markov Chain", "Hidden Markov Model", or other state of the art machine learning methods.

Many of these known machine learning methods, including Perceptron, Winnow and Logistic Regression, have online versions capable of continuously learning from data. By utilizing such online learning methods, the quality of the prediction of the optimum reference input for the motor flux can be continuously improved during operation.

Inputs of the unit capable of learning are, according to the present invention, internal and/or external signals and system values. Output of the unit capable of learning is $\Psi_{2ref}$ (reference value for the motor flux), or $i_{1d\ ref}$ (reference value for the current component responsible for the flux excitation). The objective function that the learning algorithm should minimize is the difference of the output of the unit capable of learning (for example $\Psi_{2ref}$) and the flux $\Psi^2$, which is necessary for delivering the motor torque for the proper operation of the machinery. A flux which is too high reduces the achievable reduction of energy consumption. It does not, however, disturb the operation itself. An error in the other direction (flux is too low) influences the dynamics of the drive negatively. It can, for example, lead to quality problems in production machinery. It is therefore reasonable to choose the error measure (cost function) in a manner so that a too low flux is penalized stronger than a flux higher than is absolutely necessary. The torque demand in the near future also needs to be taken into account because of the relatively long time necessary for increasing the rotor flux. How long into the future the torque demand must be predicted depends on the time constant of the rotor. The higher this time constant, the longer the time necessary for building up the flux. Therefore, at high time constant, the torque demand must also be considered in the distant future.

In an embodiment of the present invention, the unit capable of learning does not, for example, directly predict flux $\Psi^{2ref}$ or current component $i_{1d\ ref}$; it instead predicts the demand on torque in the near future. Given the coming torque demand, the proper magnitude of flux can easily be determined. The advantage of this method is that the unit capable of learning can learn in a first operational phase without consequences. In this initial phase of learning, the motor works with nominal flux without flux weakening. The flux will not be reduced before the unit capable of learning has learned to properly predict the torque demand with high reliability. The prediction on torque demand will thereafter be utilized to set the reference value of the motor flux.

The system can simply be reset if there is a deliberate change of the operation, such as a change of format in a manufacturing plant. After a reset, the drive will work with maximum (i.e., nominal) flux and the unit capable of learning will attempt to again learn the pattern in the torque demand. The unit capable of learning thus forgets the regularities in the torque demand previously learned, and it will learn once more the relationship between system values it can observe and the demand of torque which can be expected ($m_{ref\ max}$).

If there is a change in the system's behavior which causes the actual torque demand to be higher than predicted, the unit capable of learning can by itself recognize that a change has occurred. A difference between predicted and real torque demand in the other direction, i.e., a smaller real torque demand than predicted, is not critical and can be ignored without any negative consequences. The reaction to a recognized system change can be determined by design or set by the operator. One possibility is that the unit capable of learning will be reset and the learning process will be restarted. It is conceivable, however, that the change in behavior of the system indicates a problem in the equipment, in which case it can be reasonable to issue an alarm signal. Depending on previously-defined circumstances, it can even be reasonable to shut down the operation of the equipment.

The procedure of flux reduction outlined above is especially advantageous for drives which work in field weakening. To be able to work with higher than nominal speed, the flux of the electric motor is reduced in this operation mode. In doing so, the motor can achieve high speed despite of having stator voltage not higher than nominal. This is only possible, however, when the torque demand is reduced. It takes a relatively long time to reduce the rotor flux, in particular for induction motors. It is therefore advantageous if the drive reduces the motor flux in every case when possible (this means that no higher torque demand is predicted). The energy efficiency and the dynamic in field weakening will thus be improved according to the present invention.

It can furthermore be beneficial if the unit capable of learning predicts not only the maximum torque demand, but also other variables such as the reference value of the rotational speed ($n_{ref}$). By comparing the predicted value of $n_{ref}$ to the actual reference value that the drive obtains, the unit capable of learning can recognize a change in operation, such as a format change in a production plant, with higher probability. In so doing, the unit capable of learning can recognize such a change before the operation of the equipment would be negatively influenced by a too low motor flux caused by an incorrect prediction for the torque demand.

The prediction of the future torque demand can be also used to improve the dynamics of the drive by temporarily increasing the motor torque in case of need. The motor is fed by an inverter. This inverter can deliver only a certain maximum current $i_{max}$, limited by its power electronics circuit. As set forth above, the stator current of an induction motor consists of two current components $i_{1d}$ and $i_{1q}$. The motor torque corresponds to the product of the current component $i_{1q}$ and the rotor flux which itself is affected by the current component $i_{1d}$. The equation of the current limitation is:

$$|i_1|=\sqrt{i_{1d}^2+i_{1q}^2} \leq i_{max}$$

The flux is normally kept constant in the case of a field oriented motor control. According to the control structure of the drive, the current component $i_{1d}$ is therefore constant (at open-loop control of the flux) or approximately constant (at closed-loop control of the flux). The upper bound for the current component $i_{1q}$ is therefore:

$$i_{1q} \leq \sqrt{i_{max}^2-i_{1d}^2}$$

This bound also limits the maximum possible motor torque. However, the current component $i_{1q}$ and, therefore, the motor torque m can be increased temporarily without violating the bound for the total motor current if the current component $i_{1d}$ is simultaneously reduced. The rotor flux does not react immediately to this reduction because of the relatively large time constant of the rotor circuit. After time, however, the rotor flux would shrink without an appropriate compensation with higher than nominal current component $i_{1d}$. This is possible without violating the total current limitation only if the torque demand and therefore the current component $i_{1q}$ is limited in the following time period. According to the present invention, the torque demand prediction of the unit capable of learning can be used to decide whether a temporary torque increase for improving the motor dynamics is possible without the threat of a dynamic degradation in the subsequent time period.

A crucial characteristic of the present invention is that the drive is enabled to predict the torque demand without any a priori knowledge about the equipment in which the drive is installed. With the help of autonomous learning by the unit capable of learning, the torque demand of the drive can be predicted and the prediction can be used to optimize the motor flux with the objective of reducing energy consumption. The present invention does not, however, exclude the possibility of improving the flux control by a priori knowledge about the machine, the equipment, or the plant itself, or knowledge about the typical requirements of the relevant equipment class.

In an embodiment of the present invention, a modified supervised learning method can, for example, be applied. In a classic supervised learning method, the machine obtains a collected set of data (training examples) classified by a knowledgeable external supervisor. The task of the learning algorithm is to recognize patterns in this data and to find generally valid rules which can be utilized to classify future, unseen data.

In this embodiment of the present invention, the machine itself autonomously collects data and classifies the collected data. The task of the machine is, similarly to a classic supervised learning method, to find rules to classify future data. In contrast to the classic supervised methods, however, the unit capable of learning performs this task in real time. To do so, the unit capable of learning must execute the following subordinate tasks:

Task 1: Collecting the Data

To collect data, sampled values of available digital and/or analog signals are stored. Useable signals include internal values of the drive, such as reference values of rotational speed and motor torque. External data are also useful, such as reference values of the rotational speed and torque of other drives in the equipment and further available control signals and measured values of sensors and actors installed in the equipment and in its environment. The internal scope function of the electric drive can also be utilized for the storage of data.

Task 2: Feature Selection and Feature Extraction

The collected data can be handled as time series data. Certain signals are, however, better processed in the frequency domain. In order to do so, the original time series data must be converted into spectral components. One known method for this task is the Fast Fourier Transformation (FFT).

There are likely many signals in the equipment or production plant which cannot contribute to the prediction of torque demand, either alone or when combined with other signals. If these signals are utilized in the learning process, they increase the dimensionality of the feature space without any benefit, thus impeding the learning process. In order to make the learning task solvable with limited technical and economic effort and in a reasonable time frame, it is useful to exclude irrelevant signals from the learning process. This act is called dimensionality reduction. The unit capable of learning can autonomously choose the signals it utilizes in the learning process, decide the proper recording duration, and, for analog signals, it can optimize the resolution and the sample rate of the analog-digital conversion.

Known methods exist in the state of art for said signal selection. These methods can be found under the generic terms "feature selection", "feature filtering", "feature wrapping", or "feature transformation".

Some beneficial dimensionality reduction methods include:
  Principal Components Analysis (PCA);
  Independent Components Analysis (ICA);
  Random Components Analysis (RCA); and
  Linear Discriminant Analysis (LDA).

In some cases it is also expedient to examine via a simple correlation calculation whether certain signals correlate with the output value to be predicted (e.g., future torque demand).

For this purpose, the cross-correlation function or the cross-spectral spectrum (or "cross spectral density", CSP) must be computed as usual in signal analysis. The signal can likely be used for the prediction in the case of high correlation.

Classification or regression methods which are known to yield output function which only depend on a small subset of features can also be used as feature selection methods. L1-regularized logistic regression and LASSO are examples of such algorithms.

In order to simplify and accelerate the learning process, it is often recommendable to prepare the signals utilized for learning ("feature extraction"). A possible way to solve the main task according to the present invention arises from the circumstance that many production facilities which utilize such drives capable of learning work sequentially. For example, the workpiece passes through several handling and processing stations. An increased current consumption of the drive in the predecessor station can therefore indicate that the drive in the successor station must soon expect an increased torque demand.

An easy way to utilize this fact is by comparing the power consumption or the input current of the drive in the predecessor station with a boundary value and taking the measured time after the crossing of the boundary value as training data. In each different facility, plant, or equipment, the chronological order in the process can vary, as well as the time lag between the operations in diverse stations. The task of the unit capable of learning is therefore to recognize these relationships and to learn the time lag between the operations in these stations. In so doing, the drive is able to autonomously adapt itself to the application in which it has been installed.

Similarly, other events such as changes in the rotational speed in another drive in the environment, digital signals such as starting or activating signals of different actuators, or output signals of various sensors can be utilized for learning. In a corresponding embodiment, the unit capable of learning autonomously selects the appropriate events and uses their timestamps as features for the learning process.

The time interval for the maximum torque demand used for the classification of training data (or for the regression model) starts after the feature signals have been recorded. The exact start and the end of the time frame can be defined depending mainly on the rotor time constant of the inverter-fed motor. The torque demand immediately after the feature signals have been recorded need not be mandatorily considered because the drive cannot abruptly increase its flux anyway. On the other hand, the torque demand need not be considered after a certain time in the future because the drive can increase its flux early enough even if it begins increasing the corresponding current component somewhat later. The torque demand must therefore be predicted only in a finite time interval in the near future. Thus, in the learning phase, the unit capable of learning can autonomously collect the input values as well as the desired output values. (Latter is the maximum torque demand in the said time interval.) The unit capable of learning can repeat this procedure until enough data for the learning process exists.

Task 3: Learning from Data

Many known learning methods can be considered for the basic learning process such as Artificial Neural Networks, Convolutional Neural Networks, Boosting, Support Vector Machines, Markov Chains, Hidden Markov Models, k-Nearest-Neighbors, Naive Bayes Classifier, Bayesian Networks, Deep Learning, etc.

In the case of limited storage capacity and computational power, it is reasonable to use a relatively simple linear method such as Perceptron, Logistic Regression, or Winnow. All of these methods also have a kernelized version for non-linearly separable data. It is also possible to learn a good kernel from the data, even in an online fashion, so that the unit capable of learning can continuously improve the kernel it uses for these learning methods.

In an embodiment of the present invention, the torque demand can, for example, be analyzed in a time frame whose length has been chosen by the unit capable of learning itself. The data points consist of the time series or of the spectral density of the selected signals. A real number can be assigned as the output of the prediction to each data point in the feature space. This real number is the torque demand in the defined time frame (for example in mNm, in Nm or in any other scaling). The appropriate learning method is therefore a regression model since the output is continuous rather than discrete. There are many known regression models in the machine learning literature such as "Linear Regression", "LASSO", "Ridge Regression", "Support Vector Regression", and "ARIMA", etc.

In an embodiment of the present invention, the future torque demand can, for example, be classified in several torque classes. The torque demand in the following time interval can be classified in finite number of classes (such as 3, 5, or 10). For example, the first class corresponds to the minimum and the last class to the maximum torque demand. In so doing, multiclass classifiers rather than regression models can be utilized.

Task 4: Validation of the Capability for Accurate Predictions ("Degree of Confidence")

The unit capable of learning can autonomously verify its ability to predict the future torque demand. In order to do so, it is useful to insert a test phase after the completed learning phase. In this test phase, the unit capable of learning predicts the torque demand that can be expected without actively affecting the rotor flux. For the evaluation of the prediction quality, the predicted torque demand will be compared with the following reference value for the motor torque provided directly or indirectly by the superordinate control unit. Deviations must be non-linearly scored: too high predictions on the future torque demand are less critical and therefore must be tolerated to a greater extent than too low torque demand predictions which can be dangerous for accurate operation.

What was learned can be applied if the test phase indicates a good prediction quality. That is, the predictions of the unit capable of learning can be used to control the motor flux reference value.

The predictions cannot be used in operation if the prediction quality is poor. The easiest way to address this is to shut down the unit capable of learning and to operate with constant motor flux. In an embodiment of the present invention, however, the unit capable of learning does not give up and tries to improve its learning process.

Task 5: Autonomous Optimization of the Learning Process

The reason for poor prediction quality can be, among others, high bias (underfitting) or high variance (overfitting). If the prediction quality of the future torque demand is not sufficient, the unit capable of learning can utilize other known learning methods.

In an embodiment of the present invention, the unit capable of learning can, for example, first start with a relatively simple learning method with limited demand on resources, for example, with perceptron. If necessary, it can later try to use more expensive methods such as support vector machines.

Some learning algorithms have hyperparameters whose values need to be set before the training phase. The unit capable of learning might utilize hyperparameter tuning methods (such as grid search or random search) and use the real-time data to evaluate the performance of various hyperparameter values. Also, for some machine learning algorithms, the simultaneous optimization of model parameters and hyperparameters is also possible.

If the internal resources (computing power and storage capacity) of the unit capable of learning are not sufficient for an advanced learning method, it can possibly make use of plant internal or external cloud services.

Task 6: Utilization of Predictions and Control of Operation

Once the prediction quality of the unit capable of learning has been evaluated as adequate, the prediction can be used to set flux reference values. In so doing, the power consumption of the drive can be reduced. In an embodiment of the present invention, the quality of the predictions can, for example, continue to be monitored after the learning phase. In order to do so, the predicted and actual torque demands are compared continuously or at least periodically. After a change in the operation of the equipment, for example, caused by a change of format in a production plant, the predictions will be no longer accurate. The unit capable of learning can in this case start the learning phase again without any bias.

This kind of surveillance of operation can be extended with the option that the unit capable of learning be inhibited or reset, for example, by the superordinate control unit. The command therefor can be transmitted by any communication channel such as a field bus or an internet-based communication service. It can also be reasonable to manually or automatically inhibit or reset the unit capable of learning in special cases, such as in a test phase of the equipment, after an update of the control program in the equipment, or before a format change in the production plant.

In an embodiment of the present invention, the whole learning process can, for example, not be completely repeated. The unit capable of learning instead works again with the successfully chosen input signals, the signal extraction methods, and the machine learning method. Only the learning procedure in the narrower sense must therefore be repeated. In this case, however, the unit capable of learning must be informed or must be able to autonomously recognize if the drive was removed from its original operating site and is now installed in a new part of the equipment or in new equipment. The unit capable of learning must thereafter completely repeat the entire learning process.

The unit capable of learning can, for example, be realized by a software solution. The control method according to the present invention can, for example, be implemented in at least one programmable electronic component such as microprocessor (µP), microcontroller (µC), digital signal processor (DSP), graphics processing unit (GPU), programmable logic controller (PLC), industrial personal computer (IPC) or other suitable programmable electronic component. The program can also be distributed among several programmable components or devices. The programming can be done in a machine-oriented language, such as assembler, or in a high-level programming language, such as C, C++, C#, R, Python, etc. The program can also be generated automatically or semi-automatically, for example, from a MATLAB/Simulink model or from a cyber-physical system.

In an embodiment of the present invention, the method or parts of the method can, for example, be realized in an appropriate hardware component. Such a component can be an application specific integrated circuit (ASIC) or a programmable circuit such as a field programmable gate array (FPGA).

The unit capable of learning can be part of the inverter or the motor control. It can nevertheless also embody a separate device. It can also be realized by software or hardware in another device of the equipment or even outside the equipment, for example, by a cloud service.

In an embodiment of the present invention, parts of the realization of the process according to the present invention can, for example, be physically separated. The reason therefor is the different resource requirements of the individual tasks. In many learning methods, the learning process needs a large amount of computational power or/and storage capacity, but prediction itself is much less expensive ("eager learning"). In this case, the motor controller might be able to make predictions without any hardware extension but might not be able to learn the regularities for this prediction by itself. The learning process can be solved outside the motor controller by other devices in the equipment or production plant, by external services or by devices that are used only for the start-up operation of the equipment or plant, such as PC, laptop computer, smart phone, etc. Similarly, for some learning algorithms, training might not require a lot of resources but feature selection or model selection (especially if done by exhaustive search) might be more resource-intensive. In such cases, it is these pre-training tasks that can be separated from training and prediction, and performed externally.

The signals and values that are used to make predictions, such as control, reference, and measured values of sensors and other actors, can be transmitted by digital or analog connections to the unit capable of learning. Beneficially, however, they are transmitted by a communication channel such as a field bus or internet based service ('IoT'). It can also be advantageous to use wireless connections, such as optical infrared communication networks, WLAN, etc.

PROPHETIC EXAMPLES

Most production machinery, such as winding machines for electric motor production, woodworking machinery, automatic strapping machines, and bottling plants, work with electrical drives. Robust three-phase induction motors are often used if no need for highly dynamic behavior exists. Variable-frequency drives ("VFDs") can be utilized if the speed of the motor must be changed in the production process. The electric motor used in a VFD system is usually also a three-phase induction motor. The motor is fed and controlled by a VFD controller. The VFD controller, which is sometimes referred to as a frequency converter, is a solid-state power electronics system having three subsystems: a rectifier bridge converter, a direct current (DC) link, and an inverter.

The most basic rectifier converter for drives is a three-phase, six-pulse, full-wave diode bridge. Such bridges are also available as integrated bridge rectifier modules. One established producer of such modules is, for example, the company SEMIKRON International GmbH, Nuremberg, Germany. The DC link includes a capacitor which is configured to smooth out the rectifier converter's DC output so as to provide a stiff input to the inverter. This filtered DC voltage is converted to quasi-sinusoidal alternating voltage (AC) output using the inverter's active/power switching elements. These power switching elements can be provided as separate solid-state components such as, for example, metal-oxide-semiconductor field-effect transistors ("MOS- FET") or insulated gate bipolar transistors ("IGBT"). These components can be built from silicon (Si) as a basic material but many alternatives also exist such as, for example, silicon carbide (SiC) or gallium nitride (GaN). Integrated solutions are also available having at least six solid-state switches and corresponding gate driver circuits for a convenient control.

Vector control or Field Oriented Control ("FOC") is a method of independently varying the magnitude and phase of the stator current to adapt to instantaneous speed and torque demands made on the motor. Vector control is not necessary for many applications. Precision control, optimum efficiency, and fast response control over the rotor field is instead needed. Because of the low cost of computing power, vector control is being used in more and more three-phase motor applications.

The output voltage of the motor-side inverter can be varied through modulation of the control signals for the solid-state power switches turning the switches of the motor-side inverter on and off. One method therefor is so-called pulse-width modulation ("PWM"). Programmable control components, such as micro controllers ("µC") and digital signal processors ("DSP"), with integrated three-phase pulse-width modulators for motor control applications, are available from many semiconductor manufacturers, such as, for example, Infineon Technologies AG, Microchip Technology Inc., or Texas Instruments Inc. These manufacturers also publish application notes how a motor control with these components must be built. One specific example is "Digital Signal Solution for AC Induction Motor", Application Note BPRA043, Texas Instruments Inc. The company also provides application reports, starter kits, drivers, libraries, and code examples for a rapid realization.

Most such programmable components have enough computational power to also solve additional tasks such as current control and speed control, which have a high priority because of high real-time requirements. In the background, however, the controller can still work on other tasks, such as running a machine learning algorithm. Examples of a machine learning algorithm include Logistic Regression, Naive Bayes, and Artificial Neural Networks. The unit capable of learning of the present invention can therefore be provided as a software task with lower time priority in the main controller of the drive Another example of the unit capable of learning is utilizing a microcontroller or digital signal processor with multiple processor cores. There are also many field programmable devices ("FPGA") with multiple processor cores. In these cases, a separate processor core can reserved for the realization of the unit capable of learning according to the present invention.

Some industrial drives are even provided with an integrated PC-based programmable logic controller ("PLC"). This integrated PC can also be applied to provide the unit capable of learning according to the present invention. A programmer can easily utilize existing machine learning libraries for this task. Such libraries include scikit-learn provided by INRIA, Vowpal Wabbit by Microsoft Research, LIB LINEAR and LIBSVM by National Taiwan University, and others. The use of such libraries can accelerate the development process. Some of these libraries, such as scikit-learn, include functionality for several tasks of the unit capable of learning, i.e., feature selection and feature extraction, learning (including both classification and regression), and hyperparameter tuning for the autonomous optimization of the learning process. Some libraries also have interfaces for several programming languages, most typically Python, R, Java, MATLAB, and C++. The unit capable of learning can be provided, however, without using libraries from other sources. A programmer can instead write the code for the unit capable of learning himself/herself. Detailed instructions for programming machine learning functions can be found, for example, in Joel Grus, Data Science from Scratch, O'Reilly Media, Inc., First Edition (2015). The choice of a library or other method of implementation often involves trade-offs, most typically between performance and ease of implementation. One possible approach is to first collect data from expected typical applications, prototype several machine learning solutions using an easy-to-use high-level library on a powerful general purpose computer, and only implement the most promising algorithms using a highly efficient library or, depending on the availability of such libraries for the specific hardware environment, by writing an implementation of the algorithms from scratch using a lower level, performance-oriented programming language such as C or C++.

The descriptions above are based mainly on drives with induction motors. The present invention, however, is not limited to these motors, but can rather be used in any kind of electric drive with electrically excited motors. The present invention is correspondingly not limited to the illustrated and described exemplary embodiments, but rather includes all embodiments of like effect within the sense of the present invention. Reference should also be had to the appended claims.

What is claimed is:

1. A method to control a motor which is electrically excited, the method comprising:
   providing a drive comprising the motor and an inverter; and
   providing a unit which utilizes a first learning method to analyze processes in machinery which comprises the drive, the motor and the inverter so as to learn to control a variable motor flux of the motor, wherein the unit thereby:
   analyzes a first selection of signals available in the machinery so as to directly learn to determine a minimal current value of the variable motor flux necessary for the motor to generate a torque which is required in a near future, and
   sets the variable motor flux to be sufficient to operate the machinery and to minimize motor losses of the drive,
   or
   analyzes the first selection of signals available in the machinery so as to learn to predict a future torque demand,
   uses the future torque demand predicted to determine a minimal necessary motor flux required, and
   sets the variable motor flux to be sufficient to operate the machinery and to minimize motor losses of the drive.

2. The method as recited in claim 1, wherein the first selection of signals comprise at least one of digital signals and analog signals from at least one of,
   internal values of the drive comprising reference values of rotational speed and motor torque, and
   external data comprising reference values of the rotational speed and a torque of other drives in the machinery, control signals and measured values of sensors installed in the machinery and in an environment of the machinery, and control signals and measured values of actors installed in the machinery and in the environment of the machinery.

3. The method as recited in claim 1, wherein the first learning method includes at least one of Artificial Neural Networks, Convolutional Neural Networks, Boosting, Support Vector Machines, Markov Chains, Hidden Markov Models, k-Nearest-Neighbors, Naive Bayes Classifier, Bayesian Networks, Deep Learning and a regression model comprising Linear Regression, LASSO, Ridge Regression, Support Vector Regression, and ARIMA.

4. The method as recited in claim 1, wherein the unit,
monitors its operation by comparing a predicted torque demand with an actual torque demand and, if a deterioration in a prediction quality is determined based on a change in the machinery,
resets itself so as to set a nominal flux to a reference value and to restart its operation from a learning phase.

5. The method as recited in claim 4, wherein the unit learns to predict a reference value of a motor rotational speed in order to determine a change in the machinery by evaluating a prediction quality of the reference value by comparing a predicted reference value of the motor rotational speed with an actual reference value obtained by the drive.

6. The method as recited in claim 1, wherein the first learning method comprises:
in a first operational phase, collecting, selecting and preparing data so as to learn to predict the future torque demand,
in a second operational phase, verifying a quality of the predicted future torque demand without affecting the variable motor flux and, if the quality of the predicted future torque demand is acceptable,
in a third operational phase, using the predicted future torque demand to affect the variable motor flux.

7. The method as recited in claim 6, wherein the unit repeats the first learning method with at least one of a further selection of signals and a further learning method if the quality of the predicted future torque demand with a previous selection of the signals and the first learning method was not acceptable to control the variable motor flux.

8. The method as recited in claim 7, wherein the first learning method is a simple learning method requiring limited computing power and storage capacity and, if required, the unit continues its operation with a more complex second learning method until a quality of the predicted future torque demand which is acceptable is achieved, the quality of the predicted future torque demand being determined by comparing the predicted future torque demand with an actual future torque demand.

9. The method as recited in claim 8, wherein the first learning method and the more complex second learning method are each a learning algorithm.

10. The method as recited in claim 1, wherein the motor is an induction motor.

11. The method as recited in claim 1, wherein the motor is built into a production plant.

12. A device to feed and control a motor which is electrically excited, the device comprising the unit as recited in claim 1.

13. The device as recited in claim 12, wherein the unit predicts the future torque demand without any prior knowledge regarding the machinery which comprises the drive.

14. The device as recited in claim 12, wherein,
a learning method and predictions according to learned rules are implemented in different devices, and
the learned rules are provided by the unit itself autonomously collecting data and classifying the collected data to find rules to classify future data.

15. The device as recited in claim 12, wherein the unit comprises a program based on at least one machine learning algorithm which is implemented in at least one programmable electronic component.

16. The device as recited in claim 15, wherein the program is split in at least a first part and a second part, the first part and second part being implemented in different programmable electronic components.

17. The device as recited in claim 16, wherein the first part learns from the signals of the machinery so as to produce a result, and the second part makes predictions utilizing the result of the first part.

* * * * *